(12) United States Patent
Mosa et al.

(10) Patent No.: US 8,703,089 B2
(45) Date of Patent: Apr. 22, 2014

(54) METHOD AND APPARATUS FOR THE MANUFACTURE OF HIGH PURITY CARBON MONOXIDE

(75) Inventors: Tammer Mosa, Tulsa, OK (US); Gerard T. Taylor, Baton Rouge, LA (US)

(73) Assignee: INO Therapeutics LLC, Hampton, NJ (US)

(*) Notice: Subject to any disclaimer, the term of this patent is extended or adjusted under 35 U.S.C. 154(b) by 226 days.

(21) Appl. No.: 13/038,539

(22) Filed: Mar. 2, 2011

(65) Prior Publication Data
US 2011/0217226 A1 Sep. 8, 2011

Related U.S. Application Data

(60) Provisional application No. 61/309,973, filed on Mar. 3, 2010.

(51) Int. Cl.
*C01B 31/18* (2006.01)

(52) U.S. Cl.
USPC ........................................ 423/418.2; 423/418

(58) Field of Classification Search
USPC .............................................. 423/418, 418.2
See application file for complete search history.

(56) References Cited

U.S. PATENT DOCUMENTS 5,492,880 A * 2/1996 Zaki et al. .................... 502/330

OTHER PUBLICATIONS

Action of carbon monoxide on nickel Ludwig Mond, Carl Langer and Friedrich Quincke J. Chem. Soc., Trans., 1890,57, 749-753 DOI: 10.1039/CT8905700749.*

H. N. Barham and Louis Watts Clark. "The Decomposition of Formic Acid at Low Temperatures". J. Am. Chem. Soc., 1951, 73 (10), pp. 4638-4640.*

Thompson, J. G., "Pure Carbon Monoxide for Experimental Purposes", *Industrial and Engineering Chemistry* Apr. 1929, 389-390.

* cited by examiner

*Primary Examiner* — Stanley Silverman
*Assistant Examiner* — Richard M Rump
(74) *Attorney, Agent, or Firm* — Servilla Whitney LLC

(57) ABSTRACT

Method and apparatus of making 99.99% pure gaseous carbon monoxide comprising the steps of degassing liquid formic acid producing degassed liquid formic acid; reacting the degassed liquid formic acid or a degassed gaseous formic acid with a liquid mineral acid at an elevated temperature producing a gas phase comprising carbon monoxide gas and water vapor and a liquid phase; condensing the gas phase producing liquid water and gaseous carbon monoxide; scrubbing the carbon monoxide gas producing a gaseous 99.99% pure carbon monoxide having a purity of at least 99.99%, and, compressing the gaseous 99.99% pure carbon monoxide producing the 99.99% pure gaseous carbon monoxide, wherein the method is performed at least in the substantial absence of metallic nickel, metallic iron, nickel-containing alloys, and, iron-containing alloys from contacting any of the liquids or gases, wherein the $Fe(CO)_5$ content is less than 1 ppb, wherein the $Ni(CO)_4$ content is less than 10 ppb, wherein the water moisture content is less than 5 ppm, and, wherein the $CO_2$ content is less than 2 ppm. Gaseous carbon monoxide purities of 99.998% and 99.999% are achieved by removing residual air from the gaseous carbon monoxide.

19 Claims, 1 Drawing Sheet

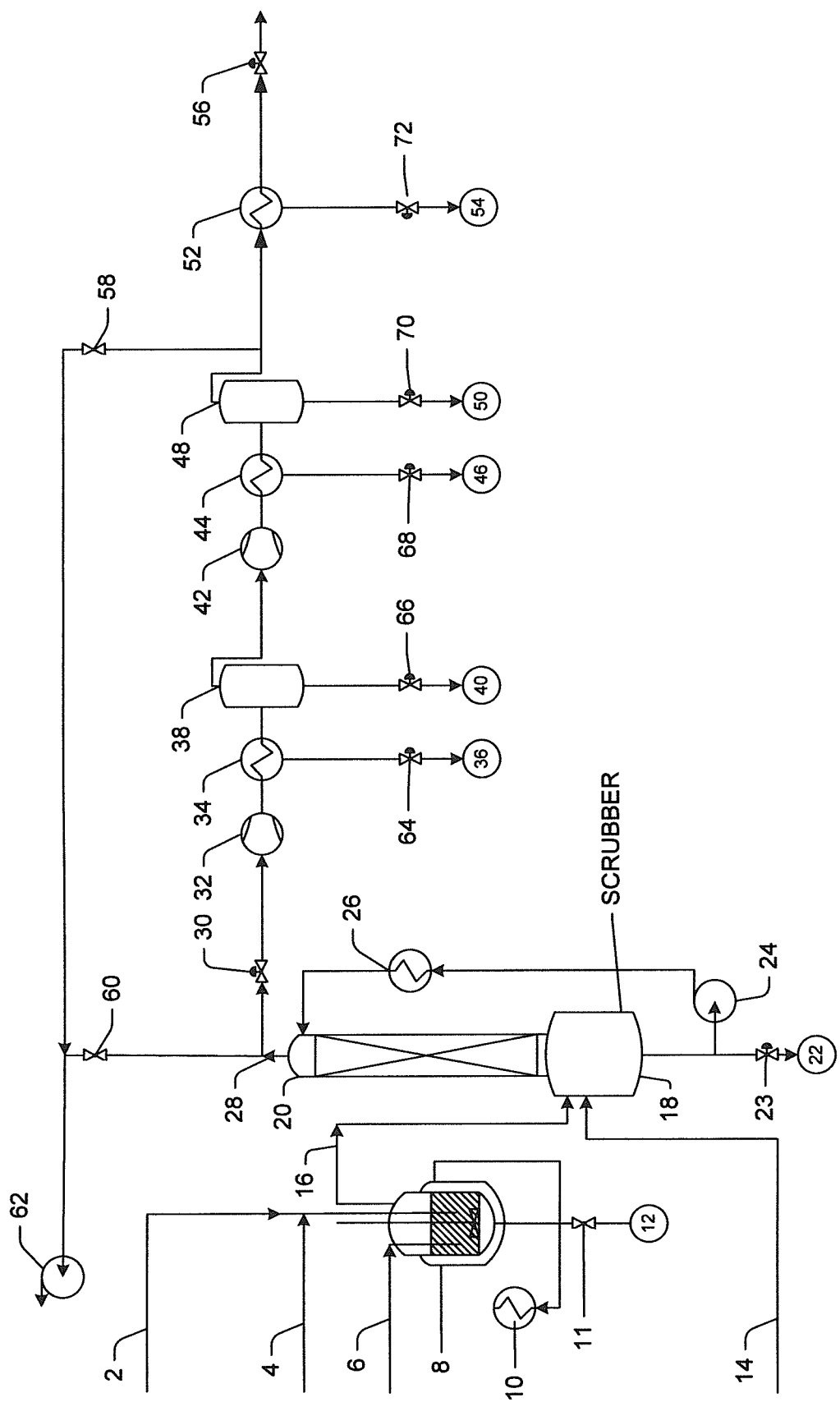

METHOD AND APPARATUS FOR THE MANUFACTURE OF HIGH PURITY CARBON MONOXIDE

CROSS REFERENCE TO RELATED APPLICATIONS

This application claims priority under 35 U.S.C. §119(e) to U.S. Patent Application Ser. No. 61/309,973, filed Mar. 3, 2010, which is hereby incorporated by reference in its entirety.

BACKGROUND

Recently, there have been studies concerning the endogenous production and the many physiological functions of carbon monoxide. Many studies have looked at the roles of carbon monoxide in the immune, respiratory, reproductive, gastrointestinal, kidney and liver systems. Delivery of exogenous carbon monoxide has found applications in many health research fields and clinical settings. For example, studies have shown that inhaled carbon monoxide protects tissue against several types of injuries, such as ischemia/reperfusion injuries associated with transplants. Other studies are aimed at finding innovative, preventative, and therapeutic strategies based on the physiological effects of carbon monoxide.

Several methods of manufacturing carbon monoxide exist. A process using dehydrating formic acid and a dehydrating agent is of interest. ("Pure Carbon Monoxide for Experimental Purposes," April 1929, *Industrial and Engineering Chemistry*, 21, 4: 389-390. Concentrated formic acid (around 85% NF Grade) is continuously fed into phosphoric acid (about 85% concentration, heated to the vicinity of 170° C.). The gaseous products of the reaction, carbon monoxide and steam, are then led to a water-cooled condenser to dry the carbon monoxide gas, which is then scrubbed using dilute caustic soda solution to remove traces of acid fumes. Analyses of the dried carbon monoxide gas show 99.9% carbon monoxide or better. The gas was then compressed into cylinders for storage. However, traces of impurities, such as carbonyls and carbon dioxide, were present in the gas after compression.

FDA standards for 99.99% pure carbon monoxide require manufacturing in compliance with current good manufacturing practices (GMP) in a validated process. The carbon monoxide gas must also be virtually free of all impurities, including trace amounts of carbonyl and carbon dioxide. To be approved by the FDA as an active pharmaceutical ingredient (API) GMP compliance must be achieved.

For gases, US FDA Title 21 CFR Parts 210 and 211 are applicable to assure batch uniformity and integrity of the drug product. API manufacturers need also comply with ICH guideline Q7, which has been harmonized with the GMP guide created by the International Conference on Harmonization, adopted throughout the European Union, Japan and the USA.

SUMMARY

One aspect of the invention is a method of making gaseous carbon monoxide comprising degassing liquid formic acid producing degassed liquid formic acid; reacting the degassed liquid formic acid or a degassed gaseous formic acid with a liquid mineral acid at an elevated temperature producing a gas phase comprising carbon monoxide gas and water vapor and a liquid phase according to the equations: HCOOH (14)→CO (g)+$H_2O$ (v), or, HCOOH (g)→CO (g)+$H_2O$ (v), condensing the gas phase producing liquid water and carbon monoxide gas; and, scrubbing and compressing the carbon monoxide gas producing the gaseous carbon monoxide, wherein the method is performed in at least the substantial absence of metallic nickel, metallic iron, nickel-containing alloys, and, iron-containing alloys from contacting any of the liquids or gases, wherein the $Fe(CO)_5$ content is less than 1 ppb, wherein the $Ni(CO)_4$ content is less than 10 ppb, wherein the water moisture content is less than 5 ppm, and, wherein the $CO_2$ content is less than 2 ppm.

The extremely low concentration of carbonyl-containing impurities is very advantageous. In particular, the low concentration $Ni(CO)_4$ is highly advantageous to providing the instant high purity carbon monoxide. By the phrase "substantial absence" of the listed reactive metallic materials it is meant that their absence from contacting any of the liquid or gases is sufficient to achieve the listed concentrations of contaminants, such as the carbonyl-containing compounds, moisture and the like, and to achieve at least 99.99% pure compressed carbon monoxide end product. Liquid carbon monoxide is not made or contemplated by any aspect or embodiment of the instant invention.

In an exemplary embodiment of the method, the scrubbed and compressed carbon monoxide gas has a purity of at least 99.99%.

In another exemplary embodiment of the method, the method further comprises removing residual air from the scrubbed and compressed carbon monoxide gas providing a purity of at least 99.998% or 99.999%.

In another exemplary embodiment of the method, the method is performed continuously, semi-continuously or batch wise.

In another exemplary embodiment, the mineral acid comprises phosphoric acid, sulfuric acid or a combination thereof.

In another exemplary embodiment of the method, the mineral acid comprises phosphoric acid.

In another exemplary embodiment of the method, the concentration of the phosphoric acid is in the range of 85% to 88%.

In another exemplary embodiment of the method, the elevated temperature is in the range of 101° C. to 180° C.

In another exemplary embodiment of the method, the liquid phase comprises un-reacted and degassed liquid and/or gaseous formic acid and liquid phosphoric acid, and, the phosphoric acid is regenerated.

In another exemplary embodiment of the method, the method is performed continuously and in a controlled manner. The reaction is performed at a substantially constant elevated temperature, the concentration of the degassed liquid or gaseous formic acid is substantially constant over time by reacting additional degassed liquid or gaseous formic acid with the liquid phosphoric acid, and, the rate of reaction is controlled by controlling the rate of degassed liquid or gaseous formic acid available for reaction with the liquid phosphoric acid. A computer and related equipment may be used to control the process and apparatus.

In another exemplary embodiment of the method, the carbon monoxide gas is scrubbed with a caustic solution comprising NaOH at a concentration in the range of 2% to 10%.

In another exemplary embodiment of the method, the method is performed continuously, and, the caustic solution is replenished continuously.

In another exemplary embodiment of the method, the method is performed semi-continuously. The carbon monoxide gas is scrubbed with a caustic solution comprising NaOH, the caustic solution is depleted to no less than a predetermined depleted concentration, and, the concentration of the caustic solution is regenerated upon reaching the predetermined depleted concentration.

In another exemplary embodiment of the method, the method further comprises chilling the scrubbed carbon monoxide gas to a temperature in the range of −30° C. to −90° C. producing a scrubbed and chilled carbon monoxide gas.

In another exemplary embodiment of the method, the 99.99% pure carbon monoxide gas is compressed to a pressure in the range of 1000 psig to 2200 psig or 1500 psig to 2200 psig.

In another exemplary embodiment of the method, the method further comprises drying the scrubbed and/or chilled carbon monoxide gas.

In another exemplary embodiment of the method, the method further comprises storing the compressed carbon monoxide having a purity of at least 99.99% in a pressurized canister.

In another exemplary embodiment of the method, the method is performed in at least the substantial presence of glass, a suitable copper alloy, a suitable aluminum alloy, titanium or a suitable titanium alloy, brass, a copolymerization product of a tetrafluoroethylene and a perfluoroalkoxy resin, or combinations thereof to contact any of the liquids or gases, and, the method is performed in at least the substantial absence of any metallic nickel, metallic iron, nickel-containing alloys, or, iron-containing alloys from contacting any of the liquids or gases. An exemplary copolymerization material is available from Electro Chemical Engineering & Manufacturing Co. (Emmanus, Pa. and Port Allen, La.) under the tradename EC Duro-Bond PFA Lining. By the phrase "substantial presence" of the listed materials (non-reactive or inert) it is meant that their presence contacting any of the liquids or gases is sufficient to achieve the listed concentrations of contaminants, such as the carbonyl-containing compounds, moisture and the like, and, to achieve the at least 99.99% pure compressed carbon monoxide end product. By the phrase "substantial absence" of the listed materials it is meant that any contact between the liquids and gases with the listed materials is sufficiently small to achieve the listed concentrations of contaminants, such as the carbonyl-containing compounds, moisture and the like, and, to achieve the at least 99.99% pure compressed carbon monoxide end product.

In another exemplary embodiment of the method, the method further comprises degassing the liquid mineral acid.

In another exemplary embodiment of the method, the method further comprises degassing the caustic solution.

In another exemplary embodiment of the method, the elevated temperature is above the boiling point of the mineral acid.

In another exemplary embodiment of the method, the elevated temperature is in the range of 140° C. to 170° C.

In another exemplary embodiment of the method, the method further comprises agitating the liquid phase.

In another exemplary embodiment of the method, the caustic solution is continuously maintained at a temperature in the range of 0° C. to 10° C.

In another exemplary embodiment of the method, the gas phase is condensed at a temperature in the range of 2° C. to 15° C.

In another exemplary embodiment of the method, the concentration of the degassed liquid or gaseous formic acid is in the range of 88% to 90%.

In another exemplary embodiment of the method, the concentration of the liquid mineral acid is in the range of 75% to 95% or 85% to 88%.

In another exemplary embodiment of the method, the liquid mineral acid is phosphoric acid, and, the concentration of fluoride in the phosphoric acid is less than 1 ppm. The fluoride content may be controlled by using a "Thermal Select" grade of phosphoric acid, whereby the manufacturer's specification (ICI Performance Products LP, Creve Coeur, Mo.) states that it contains about 10 ppm fluoride, which prevents/reduces etching of any glass surfaces.

In another exemplary embodiment of the method, the predetermined depleted concentration is in the range of 0% to 2%.

In another exemplary embodiment of the method, the method is performed in the absence (i.e., complete absence) of any metallic iron or iron-containing alloys from contacting any of the liquids or gases. Compressors employ some nickel alloy and stainless steel parts, so it is not possible to completely eliminate nickel alloy from the method or apparatus, but the instant apparatus may be completely absent any metallic nickel.

In another exemplary embodiment of the method, the method is performed in at least the substantial presence of glass, a suitable copper alloy, a suitable aluminum alloy, titanium or a suitable titanium alloy, brass, a copolymerization product of a tetrafluoroethylene and a perfluoroalkoxy resin, or combinations thereof to contact any of the liquids or gases.

In another exemplary embodiment of the method, the degassed liquid formic acid is employed in the reaction step.

In another exemplary embodiment of the method, the degassed gaseous formic acid is employed in the reaction step.

Another aspect of the invention is an apparatus for making gaseous carbon monoxide having a purity of at least one of 99.99%, 99.998% or 99.999% comprising a reactor vessel adapted to operate at an elevated temperature to generate a vapor phase comprising gaseous carbon monoxide and water vapor and a liquid phase, a cooling vessel adapted to condense the vapor phase producing gaseous carbon monoxide and liquid water, a scrubber adapted to remove impurities from the gaseous carbon monoxide producing the gaseous carbon monoxide having a purity of at least one of 99.99%, 99.998% or 99.99%, and, a compressor adapted to pressurize the gaseous carbon monoxide having a purity of at least one of 99.99%, 99.998% or 99.999% wherein the apparatus is at least substantially absent any metallic nickel, metallic iron, nickel-containing alloys, or, iron-containing alloys from contacting any of the liquids or gases.

In an exemplary embodiment of the apparatus, the apparatus is absent (i.e., completely absent) any metallic iron or iron-containing alloys from contacting any of the liquids or gases.

In another exemplary embodiment of the apparatus, the apparatus is adapted to operate continuously, semi-continuously or batch wise.

In another exemplary embodiment of the apparatus, the apparatus further comprises a controller adapted to control the rate of reaction in the reactor vessel, and, the apparatus is adapted to operate continuously.

In another exemplary embodiment of the apparatus, the apparatus further comprises a chiller adapted to chill the scrubbed carbon monoxide gas to a temperature in the range of −30° C. to −90° C. to remove impurities.

In another exemplary embodiment of the apparatus, the compressor is adapted to pressurize the chilled and scrubbed gaseous carbon monoxide to a pressure in the range of 1000 psig to 2200 psig to remove impurities.

In another exemplary embodiment of the apparatus, the apparatus further comprises a dryer adapted to dry the scrubbed gaseous carbon monoxide to remove impurities.

In another exemplary embodiment of the apparatus, the apparatus further comprises a pressurized cylinder adapted to store the compressed gaseous carbon monoxide having a purity of at least one of 99.99%, 99.998% or 99.999%.

In another exemplary embodiment of the apparatus, at least substantially any surface within the apparatus that contacts the liquids or gases is constructed from glass, a suitable copper alloy, a suitable aluminum alloy, titanium or a suitable titanium alloy, brass, a copolymerization product of a tetrafluoroethylene and a perfluoroalkoxy resin, or a combinations thereof. By "substantially any surface" it is meant that the listed materials contact any of the liquids and gases sufficient to achieve at least 99.99% pure compressed carbon monoxide end product.

Another aspect of the invention is a composition comprising at least one of 99.99%, 99.998% or 99.999% gaseous carbon monoxide, wherein the $Fe(CO)_5$ content is less than 1 ppb, wherein the $Ni(CO)_4$ content is less than 10 ppb, wherein the water moisture content is less than 5 ppm, and, wherein the $CO_2$ content is less than 2 ppm.

In an exemplary embodiment composition, the gaseous carbon monoxide has a purity of 99.998% or 99.999%.

Another aspect of the invention is a composition comprising at least one of 99.99%, 99.998% or 99.999% gaseous carbon monoxide made by the method and/or apparatus above, wherein the $Fe(CO)_5$ content is less than 1 ppb, wherein the $Ni(CO)_4$ content is less than 10 ppb, wherein the water moisture content is less than 5 ppm, and, wherein the $CO_2$ content is less than 2 ppm. In an exemplary embodiment of the composition, the gaseous carbon monoxide has a purity of 99.998% or 99.999%.

Another aspect of the invention is an apparatus for making gaseous carbon monoxide comprising a reactor vessel adapted to operate at an elevated temperature to generate a vapor phase comprising gaseous carbon monoxide and water vapor and a liquid phase, a cooling vessel adapted to condense the vapor phase producing gaseous carbon monoxide and liquid water, a scrubber adapted to remove impurities from the gaseous carbon monoxide producing the gaseous carbon monoxide, and, a compressor adapted to pressurize the gaseous carbon monoxide, wherein the apparatus is at least substantially absent any metallic nickel, metallic iron, nickel-containing alloys, or, iron-containing alloys from contacting any of the liquids or gases.

DESCRIPTION OF DRAWINGS OF EXEMPLARY EMBODIMENTS

FIG. 1 is a schematic illustration of the instant chemical process for making at least one of 99.99%, 99.998% or 99.999% pure compressed carbon monoxide, whereby some details and auxiliary equipment (e.g., valves, instruments, control systems, utilities, etc.) may be omitted because they are not needed to understand the method and apparatus.

DETAILED DESCRIPTION OF EXEMPLARY EMBODIMENTS

There exists a need for 99.99% pure carbon monoxide being of very high purity and lower carbonyl-containing content to meet the standards set by the U.S. Food and Drug Administration. There also exists a need for gaseous carbon monoxide being at least 99.999% pure having only trace amounts of carbonyl-containing metallic compounds.

As used herein, the term "purity" (and variations thereof) that determined by adding together the content of all the impurities and subtracting from 100%, which provides a mass balance purity value rather than an assay. An assay would have a variance of ±2% due to analytical variation at the extreme range values.

High purity carbon monoxide may be produced in a continuous process by dehydrating formic acid with a mineral acid. Various processing techniques reduce the presence and risk of generating impurities including, but not limited to, system evacuation, degassing of the chemicals involved, and, selection of materials of construction. These designs have virtually eliminated the presence of impurities commonly associated with the production of carbon monoxide. For example, moisture content has been substantially removed from the carbon monoxide by freezing it out of the gas stream. Thus, 99.99% pure carbon monoxide gas, or better, has been achieved.

Previous carbon monoxide manufacturing processes have only been capable of producing 99.9% pure carbon monoxide gas. The instant process and apparatus is capable of producing up to 99.99% pure carbon monoxide gas, which is up to a 100-fold improvement in purity.

In an instant embodiment, a steady stream of high concentration formic acid solution is reacted with a static quantity of high concentration phosphoric acid in an agitated reaction vessel heated to a temperature above the boiling points of both water and formic acid (i.e., above 101° C.) but below the point at which vapor existing over the phosphoric acid begins to contain $P_2O_5$ (and is no longer almost pure water). The reaction also occurs at a pressure slightly above atmospheric pressure.

The feed formic acid (liquid or gaseous) has dehydrated and/or degassed. The reaction products exiting the reaction zone of the reactor include gaseous carbon monoxide, water vapor, and un-reacted (liquid or gaseous) formic acid. Regeneration of the phosphoric acid in the reactor vessel occurs by boiling off any water or formic acid build-up within the reactor. Such regeneration occurs by maintaining the contents of the reaction vessel at a constant temperature and constant concentration. The bulk of the impurities in the gas stream (i.e., vapor phase) are then condensed out and/or neutralized by contacting the gas with a stream of chilled caustic solution, which is referred to as scrubbing the gas.

The caustic soda solution is consumed by neutralizing any un-reacted acid, which can be replenished continuously by bleeding off some of the caustic solution and adding a make-up feed—both at the same predetermined rate that will allow the solution to remain at a specified constant concentration and volume in the scrubber. This manufacturing process is a true continuous process.

The manufacturing process can also operate until the caustic soda solution is depleted to no less than a predetermined percentage, which is determined by the characteristics and performance of the scrubber column. This manufacturing process is semi-continuous.

The scrubbed gas may be chilled to a temperature in the range of −30° C. to −60° C. to achieve purification by solidifying and removing substantially all moisture and carbonyl content. The chiller may be set at around −81° C.±5° C. to achieve sufficient chilling of the scrubbed gas. The scrubbed gas may also be compressed up to 2200 psig to further solidify or liquefy and remove substantially all moisture and carbonyl from the gaseous carbon monoxide stream. Such compression is also useful for packaging the purified compressed gaseous carbon monoxide in pressurized canisters.

The scrubbed gas may also be passed through drying beds to remove substantially all moisture content. The drying unit may also be designed and adapted to remove substantially all of the carbonyl content.

The materials of construction employed within the carbon monoxide purification apparatus are essentially or completely non-reactive with carbon monoxide. Thus, no carbonyls or other impurities are generated or only trace/insignificant amounts of any impurities are formed. Some equipment includes reactor and storage vessels, valves, instrumentation, safety devices, pipes/conduits, scrubber, dryer, compressor and other suitable equipment. The operating conditions and engineered materials employed are inert with respect to carbon monoxide, i.e., they do not react with the materials of construction in and downstream of the purification equipment and apparatus thereof.

The instant chemical process is based on the principal reaction:

$$\text{HCOOH} \xrightarrow{\text{Phosphoric Acid}} \text{CO} + \text{H}_2\text{O}$$

The gas product contains nearly only carbon monoxide (CO) gas. Depending on the reaction conditions, trace amounts of $CO_2$ and/or $H_2$ may be generated according to the reaction:

$$\text{HCOOH} \xrightarrow{\text{Phosphoric Acid}} \text{CO} + \text{H}_2$$

To limit the formation of $CO_2$ and $H_2$, the reaction conditions are selected that limit the formation of these and other impurities.

The instant process is capable of removing substantially all $CO_2$, if present, downstream of the reaction. The reaction is conducted at conditions that cause at least a portion of the resulting water and the un-reacted formic acid to be in the vapor phase. These gases are removed from the vapor phase (i.e., gas stream) downstream of the reaction.

The materials of construction are non-reactive (i.e., inert) with carbon monoxide, but some equipment may have an insignificant amount of nickel-containing parts, such as the gas compressor. As such, carbonyl formation has been observed to be in the range of 0 to 10 ppb. However, the purification equipment is capable of substantially or completely removing such carbonyl content downstream of such potential formation surfaces.

Shown in FIG. 1 is an exemplary chemical process used to produce high purity and 99.99% pure carbon monoxide gas. The reactor vessel 8 includes a jacketed, stirred reactor for the production of carbon monoxide. The vessel 8 contents are heated by a circulating oil heater 10. Other heating configurations for the reactor are useful; the jacket is one of several alternative means for heating the vessel 8 contents. During start-up, the reactor vessel 8 is charged with all chemicals except formic acid, and the entire system is degassed by vacuum and purging using CO. Much of the residual air found in the final product may come from air dissolved in the formic acid. Other methods of degassing may be used, such as membranes, vacuum-inducing equipment and the like.

The scrubber column 20 includes a caustic storage sump 18 and a scrubber column 20 for removing impurities, which are chilled by a heat exchanger 26. The compressor is a two-stage diaphragm compressor 32 and 42 having an inter-cooler 34 and an after-cooler 44, along with their respective knock-out pots 38 and 48. The inter-cooler 34 may be a shell and tube heat exchanger cooled by circulating glycol from a chilling unit, and, it is located immediately after the first stage compressing unit (i.e., compressor 32). The after-cooler 44 may be a shell and tube heat exchanger cooled by circulating glycol from a second chilling unit, and, it is located immediately after the second stage compressing unit (i.e., compressor 42).

Although many compressor manufacturers offer similar technologies to achieve sufficient pressures, alternatives exist which may or may not include a different number of stages, different cooling set-ups, or the like. A valve 66 is provided to drain moisture and other condensed contaminants at 38. Another valve 70 is provided to drain additional moisture and additional other condensed contaminants at 48.

The cryogenic chiller 52 downstream of the compressor freezes out trace carbonyls and moisture at increased efficiency by operating at 1800-2200 psig via a downstream back-pressure control valve 56.

The reactor vessel 8 is charged with 85% phosphoric acid. The scrubber sump 18 (also referred to herein as the caustic storage sump) may be charged directly with 10% caustic solution 14. Alternatively, the sump 18 may be charged with water and concentrated caustic solution by blending them using a circulation pump 24.

These chemicals (i.e., the phosphoric acid, caustic solution, and water) may be degassed using the vacuum pump 62 to remove dissolved atmospheric gases. The formic acid may also be degassed using a suitable method to approach a carbon monoxide purity of 99.99% or more. Even absent degassing the formic acid, the total concentration of atmospheric gases (e.g., Ar, $N_2$, and $O_2$) was around 100 ppm, whereas $CO_2$ and carbonyls were in the low ppb range providing the carbon monoxide gas at a purity of at least 99.99%.

The phosphoric acid acts as a catalyst. The acid mixture is heated to above the boiling point of the water/phosphoric acid mixture thereby distilling the water, but below the point at which vapor existing over the phosphoric acid begins to contain $P_2O_5$ (and is no longer almost pure water). In one or more embodiments, the acid mixture, including phosphoric acid, formic acid and water solution is heated to a temperature in the range from about 101° C. to about 180° C. The temperature of the phosphoric acid is maintained constant in order to keep the corresponding concentration fixed as the reaction proceeds. Maintaining constant temperature and corresponding concentration is advantageous because temperature and concentration are factors that may affect the rate, efficiency, and pathways of the reaction.

The formic acid is stream-fed 6 at a controlled rate into the reactor below the surface of the phosphoric acid via a dip-tube (not shown). Agitation ensures uniformity of temperature within the reaction zone. Agitation also enhances reactant-catalyst contact. Agitation also provides bubble dispersion and increases reaction efficiency. The phosphoric acid may also be introduced into the reactor vessel 8 via vacuum-suction 4, whereby the waste phosphoric acid 12 can be left to cool after the run and then drained via a drain valve 11.

The caustic solution may be chilled to a temperature no less than 0° C. in the heat exchanger 26 to enhance carbon dioxide absorption during scrubbing. The chilled caustic solution also enhances removal of moisture and un-reacted formic acid from the carbon monoxide gas stream 16. A temperature no less than 0° C. also avoids freezing within the equipment. The gas stream is scrubbed in a packed scrubber column 20 with caustic solution for intimate contact and efficient heat transfer. Waste caustic 22 may be drained after the run using a drain valve 23. Semi-continuous operation may impose limitations on the concentration of the caustic soda solution due to physical or chemical factors. Continuous operation may avoid such limitations as lower concentrations can be constantly maintained.

As the scrubbed carbon monoxide 28 exits the scrubber column 20, a back-pressure control loop employs a valve 30 to control the pressure of the reactor vessel 8 and scrubber column 20. Where necessary, the reactor vessel 8 and scrubber column 20 can be vacuumed separately through its vacuum valve 58. Similarly, the compressor 32 and 42 can be vacuumed through a dedicated vacuum valve 60. This may be necessary at times to evacuate the undesired contents of these systems. Pure carbon monoxide from a previous run 2 may be added to ensure that on-spec carbon monoxide is obtained from the first cylinder and onward.

The compressor 32 and 42 serves a two-fold purpose; it enables the packaging of the gas into cylinders at any pressure up to about 2200 psig and it also serves to increase the efficiency of the inter-cooler 34 and the after-cooler 44 to remove moisture in the gas stream. This condensed moisture 40 and 50 can be later drained through drain valves 66 and 70 on the bottom of the knock-out pots 38 and 48 whose function is to separate and collect this liquid from the gas stream.

The cryogenic chiller 52 further removes any residual moisture from the gas stream by cooling at the higher compressor-discharge pressure, which work together to improve removal efficiency. The chiller 52 also removes or freezes out carbonyl traces so care is to be taken when dispensing waste materials 54. Carbonyls have a very short half-life in nitrogen and/or air so carbonyls in the waste materials 54 are vented using a valve 72 after thawing. Nitrogen may be used as a carrier gas.

From the foregoing it will be appreciated that, although specific embodiments of the invention have been described herein for purposes of illustration, various modifications may be made without deviating from the spirit and scope of the invention. Accordingly, the invention is not limited except as by the appended claims.

EXAMPLES

Example 1

Reaction Conditions for Process and Apparatus Shown In FIG. 1. The formic acid feed rate into the reactor vessel was set at 1.5 L/hour with a Grundfos DME/DMS metering pump. Temperature of the phosphoric acid in the reactor vessel was maintained at 160° C. to 170° C. with a Julabo HL-12 recirculation heater fitted with a booster. A 10% caustic recycle rate of 1 gal/min at 10° C. to 15° C. was used. The caustic solution was circulated through a heat changer cooled by a Lauda T4600 recirculation chiller using a March 150 Series pump. The product was compressed using a Fluitron A1 two stage compressor cooled by Lauda WK3200 and WK1400 chillers. The compressed carbon monoxide was passed through a Graham Heliflow cryogenic heat exchanger cooled by a Lauda Proline RP890 recirculation chiller operated at a temperature of −81° C.±5° C. The compressed and chilled carbon monoxide product was filled into aluminum canisters to a final fill pressure of 2000 psig.

Analysis of the final gaseous Carbon Monoxide Product. The analysis was done by a gas chromatography procedure that is used generally through the gas industry. The actual method was developed in-house. The method assays for CO and a mass balance was used to measure gas purity. The mass balance is the value obtained by adding up the concentrations of all the impurities and subtracting from 100.00. The impurities oxygen, nitrogen and argon were determined by gas solid chromatography using thermo conductivity detection. The carbon dioxide impurity was determined by infrared spectroscopy, and moisture was determined using an on-line analyzer. Each occurred at the low part per million levels. The concentration of impurities was 1.1 ppm Argon, 39.4 ppm Oxygen, 94.2 ppm Nitrogen, 0.8 ppm Carbon Dioxide, 1.7 ppm moisture. The mass balance showed a 99.99% purity of carbon monoxide. Other impurities included two carbonyls: 10 ppb $Ni(CO)_4$ and 0.01 ppb $Fe(CO)_5$.

Example 2

In a repeat of Example 1, the concentration of $Ni(CO)_4$ was below 0.04 ppm w/v, and the concentration of $Fe(CO)_5$ was less than 1 ppb w/v. Current processes can provide gaseous pressurized CO having 10 ppb or less $Ni(CO)_4$.

Example 3

In another example, residual air was removed from the carbon monoxide gas products made in Examples 1 and 2 providing a carbon monoxide gas having a purity as high as 99.998%.

In another example, residual air was removed from the carbon monoxide gas products made in Examples 1 and 2 providing a carbon monoxide gas having a purity of 99.999%.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

We claim:

1. A method of making gaseous carbon monoxide comprising:
    degassing liquid formic acid producing degassed liquid formic acid or degassing gaseous formic acid producing degassed gaseous formic acid;
    reacting the degassed liquid formic acid or the degassed gaseous formic acid with a liquid mineral acid at an elevated temperature producing a gas phase comprising carbon monoxide gas and water vapor and a liquid phase according to the equations $$HCOOH(liq.) \rightarrow CO(g) + H_2O(v), \text{ or,}$$

$$HCOOH(g) \rightarrow CO(g) + H_2O(v),$$

condensing the gas phase producing liquid water and carbon monoxide gas;

Scrubbing the carbon monoxide gas producing a scrubbed carbon monoxide gas;

chilling the scrubbed carbon monoxide gas to a temperature in the range of −30 C to −90 C producing a scrubbed and chilled carbon monoxide gas; and, compressing the scrubbed and chilled carbon monoxide gas;

wherein the method is performed in at least the substantial absence of metallic nickel, metallic iron, nickel-containing alloys, and, iron-containing alloys from contacting any of the liquids or gases, wherein the $Fe(CO)_5$ content is less than 1 ppb, wherein the $Ni(CO)_4$ content is less than 10 ppb, wherein the water moisture content is less than 5 ppm, and, wherein the $CO_2$ content is less than 2 ppm.

2. The method of claim 1, wherein the scrubbed and compressed carbon monoxide gas has a purity of at least 99.99%.

3. The method of claim 1, further comprising removing residual air from the scrubbed and compressed carbon monoxide gas providing a purity of 99.998% or 99.999%.

4. The method of claim 1, performed continuously, semi-continuously or batch wise.

5. The method of claim 4, wherein the mineral acid comprises phosphoric acid, sulfuric acid or a combination thereof.

6. The method of claim 5, wherein the mineral acid comprises phosphoric acid in the range of 85% to 88%.

7. The method of claim 1, wherein the elevated temperature is in the range of 101° C. to 180° C.

8. The method of claim 6, wherein the liquid phase comprises un-reacted and degassed liquid and/or gaseous formic acid and liquid phosphoric acid, and, wherein the phosphoric acid is regenerated.

9. The method of claim 6 performed continuously and controlled, wherein the reaction is performed at a substantially constant elevated temperature, wherein the concentration of the degassed liquid or gaseous formic acid is substantially constant over time by reacting additional degassed liquid or gaseous formic acid with the liquid phosphoric acid, and, wherein the rate of reaction is controlled by controlling the rate of degassed liquid or gaseous formic acid available for reaction with the liquid phosphoric acid.

10. The method of claim 1, wherein the carbon monoxide gas is scrubbed with a caustic solution comprising NaOH at a concentration in the range of 2% to 10%.

11. The method of claim 1, wherein the scrubbed carbon monoxide gas is compressed to a pressure in the range of 1000 psig to 2200 psig.

12. The method of claim 1, wherein the water is condensed from the gas phase at a temperature in the range of 2° C. to 15° C.

13. The method of claim 1, wherein the concentration of the degassed liquid or gaseous formic acid is in the range of 88% to 90%.

14. The method of claim 1, wherein the concentration of the liquid mineral acid is in the range of 75% to 95%.

15. The method of claim 14, wherein the liquid mineral acid is phosphoric acid, and, wherein the concentration of fluoride in the phosphoric acid is less than 1 ppm.

16. The method of claim 1, 2, or 3, wherein the method is performed in at least the substantial presence of glass, a suitable copper alloy, a suitable aluminum alloy, titanium or a suitable titanium alloy, brass, a copolymerization product of a tetrafluoroethylene and a perfluoroalkoxy resin or in the absence of any metallic iron or iron-containing alloys, or combinations thereof to contact any of the liquids or gases.

17. The method of claim 7, wherein the elevated temperature is in the range of 140° C. to 170° C.

18. The method of claim 12, wherein the water is condensed from the gas phase at a temperature in the range of 2° C. to 5° C.

19. The method of claim 14, wherein the concentration of the liquid mineral acid is in the range of 85% to 88%.

* * * * *